United States Patent
Kandil et al.

(10) Patent No.: US 7,765,200 B2
(45) Date of Patent: Jul. 27, 2010

(54) SQL QUERY PROBLEM DETERMINATION TOOL

(75) Inventors: Mokhtar Kandil, Toronto (CA); Volker Gerhard Markl, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 11/089,677

(22) Filed: Mar. 25, 2005

(65) Prior Publication Data

US 2006/0218125 A1    Sep. 28, 2006

(51) Int. Cl.
G06F 7/00 (2006.01)
G06F 17/30 (2006.01)

(52) U.S. Cl. .................. 707/713; 707/736; 707/758
(58) Field of Classification Search .............. 707/2, 707/3
See application file for complete search history.

(56) References Cited

U.S. PATENT DOCUMENTS

| | | | | |
|---|---|---|---|---|
| 5,600,831 A * | 2/1997 | Levy et al. | ........... | 707/2 |
| 5,819,255 A * | 10/1998 | Celis et al. | ........... | 707/2 |
| 5,956,706 A * | 9/1999 | Carey et al. | ........... | 707/2 |
| 6,092,062 A * | 7/2000 | Lohman et al. | ........... | 707/2 |
| 6,275,818 B1 * | 8/2001 | Subramanian et al. | ........... | 707/2 |
| 6,639,687 B1 | 10/2003 | Neilsen | ........... | 358/1.14 |
| 6,944,614 B1 * | 9/2005 | Ramasamy et al. | ........... | 707/4 |
| 7,185,000 B1 * | 2/2007 | Brown et al. | ........... | 707/3 |
| 2003/0018644 A1 | 1/2003 | Bala et al. | ........... | 707/100 |
| 2003/0078909 A1 * | 4/2003 | Pham et al. | ........... | 707/1 |
| 2003/0182276 A1 * | 9/2003 | Bossman et al. | ........... | 707/3 |
| 2003/0220921 A1 * | 11/2003 | Fagin et al. | ........... | 707/7 |
| 2005/0097078 A1 * | 5/2005 | Lohman et al. | ........... | 707/2 |
| 2005/0102613 A1 * | 5/2005 | Boukouvalas et al. | ........... | 715/513 |
| 2005/0120001 A1 * | 6/2005 | Yagoub et al. | ........... | 707/3 |
| 2005/0187917 A1 * | 8/2005 | Lawande et al. | ........... | 707/3 |
| 2005/0222965 A1 * | 10/2005 | Chaudhuri et al. | ........... | 707/1 |
| 2005/0240570 A1 * | 10/2005 | Ozbutun | ........... | 707/3 |
| 2005/0267866 A1 * | 12/2005 | Markl et al. | ........... | 707/2 |
| 2006/0020579 A1 * | 1/2006 | Freedman et al. | ........... | 707/3 |
| 2006/0059170 A1 * | 3/2006 | Dias et al. | ........... | 707/100 |
| 2006/0100989 A1 * | 5/2006 | Chinchwadkar et al. | ........... | 707/3 |
| 2006/0167865 A1 * | 7/2006 | Andrei | ........... | 707/4 |

\* cited by examiner

*Primary Examiner*—Hosain T Alam
*Assistant Examiner*—Usmaan Saeed
(74) *Attorney, Agent, or Firm*—Sawyer Law Group, P.C.

(57) ABSTRACT

A method and system for query problem determination have been disclosed. The method includes receiving a database query; creating a query execution plan for the database query comprising a plurality of query plan operators; and executing the query execution plan, wherein a progress indicator is displayed for each query plan operator. The system includes a query progress monitor, which collects progress information for each query plan operator during the execution of the query execution plan. This progress information is then communicated to a query progress visualizer and a query progress analyzer, which graphically displays the progress information as a progress indicator for each query plan operator and performs debugger type operations, respectively. In this manner, information concerning the progress of the query execution is provided at a query operator level, such that the information may be used to more efficiently debug any problems with the query.

36 Claims, 4 Drawing Sheets

SQL QUERY PROBLEM DETERMINATION TOOL

FIELD OF THE INVENTION

The present invention relates to database query tools, and more particularly to a problem determination tool for database queries.

BACKGROUND OF THE INVENTION

When executing a database query, many applications and programs display a progress bar to indicate that the query is not hanging and to show that progress is being made. Typically, a percentage of the totality of the tasks completed, or seconds remaining to complete the tasks, are displayed. However, when problems with the query arise, this type of progress display does not assist in pinpointing the problems. For example, if the progress indicator hangs up, the percentage or seconds remaining displayed provides little if any information concerning where in the query the problem may be. This inadequacy becomes more acute as the query becomes more complex.

Accordingly, there exists a need for a method and system for query problem determination. This method and system should provide information concerning the progress of the query execution at a query operator level, such that the information may be used to more efficiently debug any problems with the query. The present invention addresses such a need.

SUMMARY OF THE INVENTION

A method and system for query problem determination have been disclosed. The method includes receiving a database query; creating a query execution plan for the database query comprising a plurality of query plan operators; and executing the query execution plan, wherein a progress indicator is displayed for each query plan operator. The system includes a query progress monitor, which collects progress information for each query plan operator during the execution of the query execution plan. This progress information is then communicated to a query progress visualizer and a query progress analyzer, which graphically displays the progress information as a progress indicator for each query plan operator and performs debugger type operations, respectively. In this manner, information concerning the progress of the query execution is provided at a query operator level, such that the information may be used to more efficiently debug any problems with the query.

DETAILED DESCRIPTION

The present invention provides a method and system for query problem determination. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 4C in conjunction with the discussion below.

Figure 1:
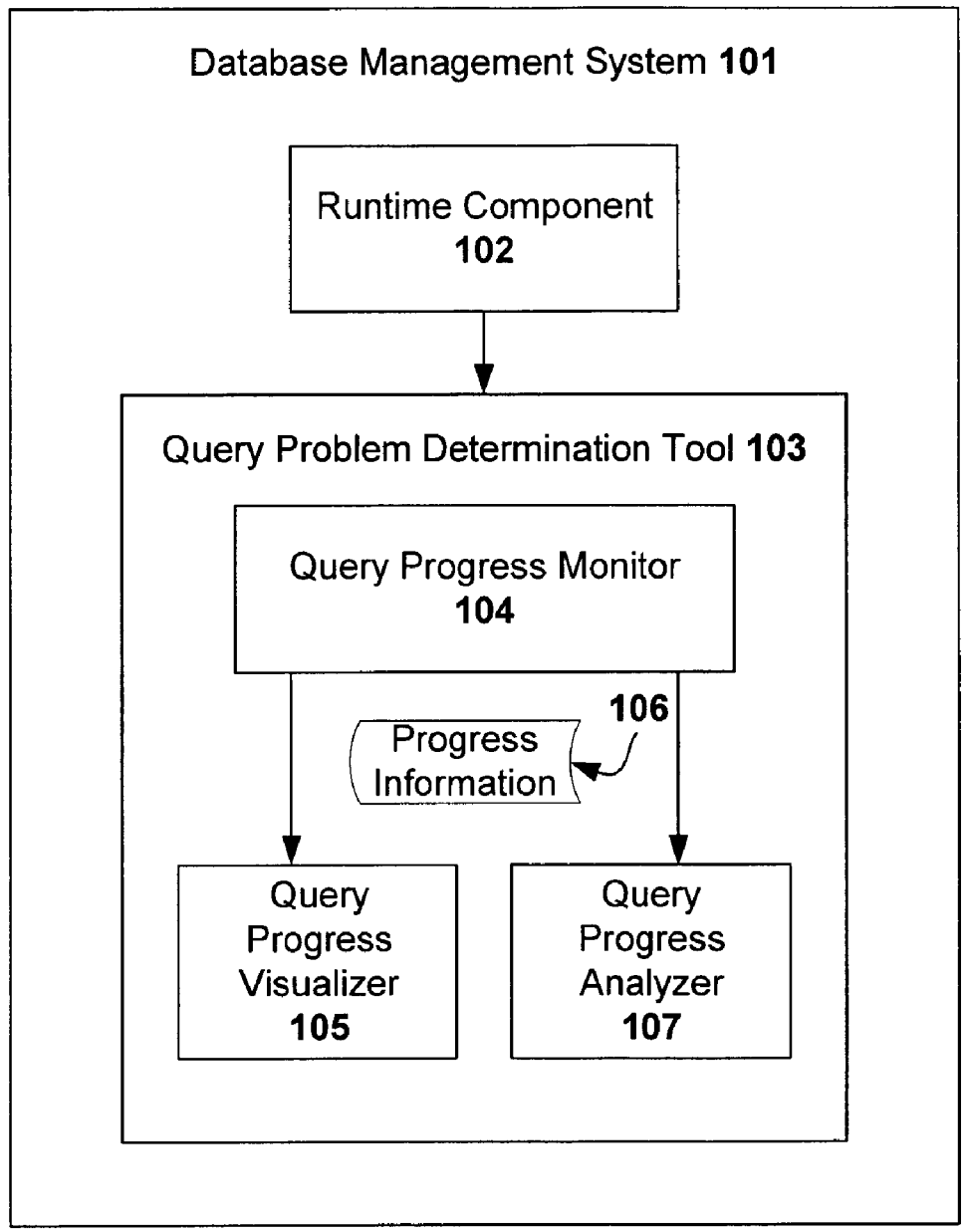
FIGS. 1 and 2 illustrate a preferred embodiment of a system and method, respectively, for a query problem determination tool in accordance with the present invention.
Figure 2:
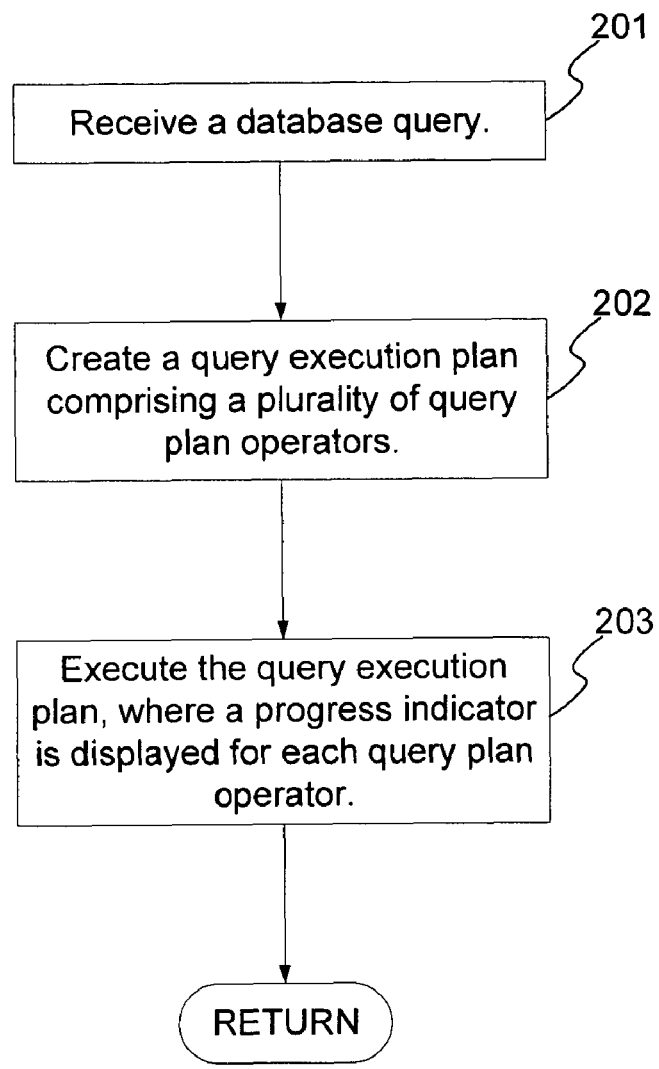

FIGS. 1 and 2 illustrate a preferred embodiment of a system and method, respectively, for a query problem determination tool in accordance with the present invention. Referring to both FIGS. 1 and 2, the system includes a database management system (DBMS) 101 with a runtime component 102. The runtime component 102 has as an extension a query problem determination tool 103. The query problem determination tool 103 includes a query progress monitor 104, a query progress visualizer 105, and a query progress analyzer 107.

When a database query is received by the DBMS 101, via step 201, a query execution plan is created, which comprises a plurality of query plan operators, via step 202. For example, in Structure Query Language (SQL), a query plan operator can be SCAN, SORT, JOIN, MERGE, etc. The query execution plan is then executed, via step 203, under the supervision of an analysis component. During execution of the plan, a progress indicator is displayed for each query plan operator. Progress information 106 is also communicated to the query progress analyzer 107, which performs deep analysis of the query plan operators based on special instructions (programmed or provided by a user), and can perform debugger type operations. In the preferred embodiment, progress information 106 related to each query plan operator are collected by the query progress monitor 104. The progress information 106 is then communicated to the query progress visualizer 105, which graphically displays the progress information 106 for each query plan operator. In the preferred embodiment, the method is implemented in software, however, other manners of implementation may be used without departing from the spirit and scope of the present invention.

The information collected by the query progress monitor 104 may include any one or combination of the following: (1) for each part of the query execution plan, the actual number of rows which have been flowing through the plan at a particular time; (2) the query text; and/or (3) the actual values of parameter markers for the query.

Figure 3:
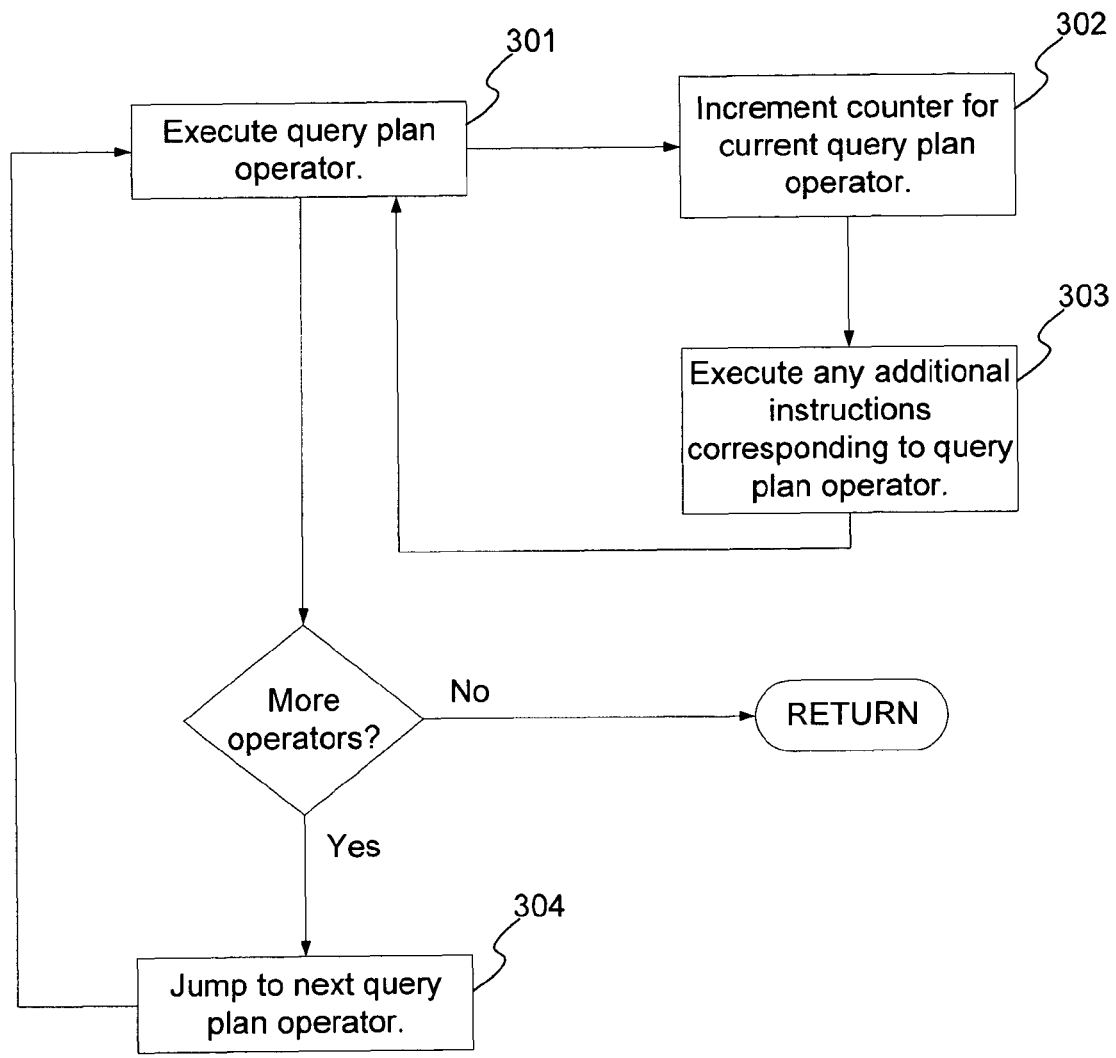
FIG. 3 is a flowchart illustrating in more detail the execution of the query execution plan in accordance with the present invention.

FIG. 3 is a flowchart illustrating in more detail the execution of the query execution plan in accordance with the present invention. First, a query plan operator is executed, via step 301. Upon the query plan operator's invocation, a wrapper function intercepts the call and jumps into debugging logic which increments a counter for the current query plan operator, via step 302, and executes any additional instructions corresponding to the query plan operator, via step 303.

For example, the additional instructions are executed by the query plan analyzer 107 and may include any one or combination of the following: (1) stop execution of the query (to allow further inspection); (2) resume execution of the query; (3) skip parts of, or modify the "normal" execution flow of the query; and/or (4) display graphically the status or progress. In the preferred embodiment, the graphical display of the progress is provided as an enhancement to a query explain tool. The query explain tool would poll the current status of the actual cardinalities processed for each part of a query execution plan and use the existing explain facility, such as graphical explain, visual explain, etc. Other types of graphics, such as bars, may be used instead.

If more query plan operators remain to be executed according to the query execution plan, then the runtime component jumps to the next query plan operator, via step 304, and steps 301 through 303 are repeated. Steps 301 through 304 are repeated until the query terminates.

Figure 4A:
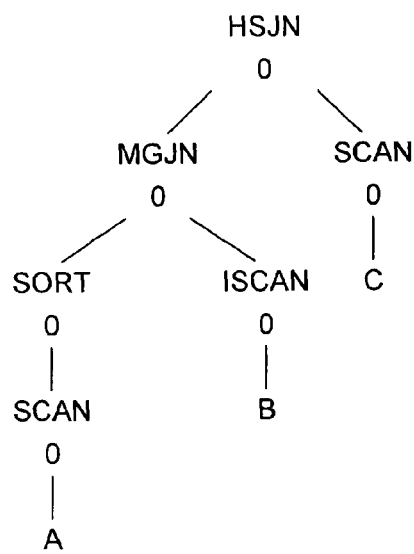
FIGS. 4A through 4C illustrate an example display in the query problem determination tool in accordance with the present invention.
Figure 4B:
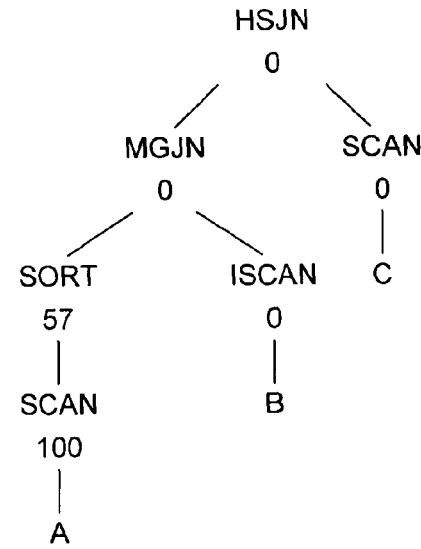
Figure 4C:
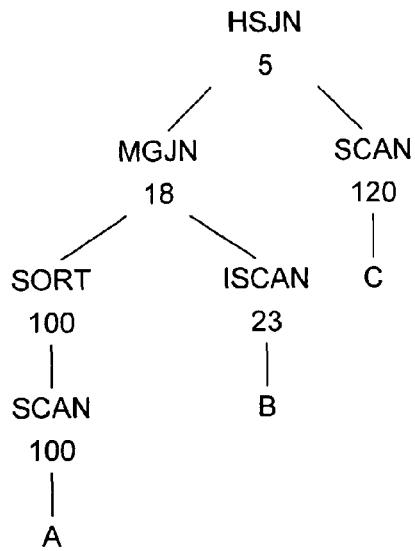

FIGS. 4A through 4C illustrate an example display in the query problem determination tool in accordance with the present invention. FIGS. 4A through 4C show a plurality of query plan operators in a tree to represent the query. In this example query, rows of table A are scanned (SCAN) and sorted (SORT). The rows of tables B and C are also scanned (ISCAN and SCAN). The rows resulting from the scan and sorts of tables A and B are then merge/joined (MGJN). The rows resulting from the merge/join of tables A and B and the scan of table C are then hash joined (HSJN). The resulting rows of the hash join are then returned as satisfying the requirements of the query.

With the query problem determination tool in accordance with the present invention, a progress indicator is displayed below each query plan operator. Here, the progress indicator is a number representing the number of rows streamed through its corresponding operator. As illustrated in FIG. 4A, initially, the progress indicators each has the value '0'. FIG. 4B illustrates the progress indicators later in time in the execution of the query execution plan. Here, 100 rows of table A have been scanned, and 57 of those rows have been sorted. FIG. 4C illustrates the progress indicators at an even later time in the execution of the query execution plan. Here, 100 rows of table A have been scanned, with all 100 rows sorted. Also, 23 rows of the table B, and 120 rows of table C, have been scanned. 18 rows of the 100 sorted rows of table A and 23 of the scanned rows of table B have been merge/joined. 5 of these 18 rows and of the 120 scanned rows of table C have been hashed joined.

At any time during the progress displayed above, the query progress analyzer 107 can be invoked to stop the progress of the query execution plan, resume it, look up variables, etc. Thus, a user can tell how the query execution plan is progressing. If one of the progress indicators becomes stuck, the values of the progress indicators at the stuck point can be used to pinpoint where in the query the problem may be found. The query progress analyzer 107 can then be used to discover why this happened. They can also be used to find other types of bottlenecks, which can then be addressed. The tool also provides the ability to step and pause within a query, similar to the step and pause through a C or Java program. It can also provide visualizing of values of host variables, parameter markers, and other query internals.

A method and system for query problem determination have been disclosed. The system includes a query progress monitor, which collects progress information for each query plan operator during the execution of the query execution plan. This progress information is then communicated to a query progress visualizer and a query plan analyzer, which graphically displays the progress information as a progress indicator for each query plan operator and performs debugger type operations, respectively. In this manner, information concerning the progress of the query execution is provided at a query operator level, such that the information may be used to more efficiently debug any problems with the query.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer-implemented method for query problem determination, wherein the computer performs the following functions comprising:

receiving a database query;

creating a query execution plan for problem determination of the database query, the query execution plan comprising a plurality of query plan operators;

executing the query execution plan;

displaying a progress indicator for each of the plurality of query plan operators during execution of the query execution plan in response to progress information; communicating progress information to a query progress analyzer for performing debugging operations; and performing debugging operations during execution of the query execution plan by a query progress analyzer, wherein performing the debugging operations comprises: skipping at least a portion of the query execution plan; pausing execution of the query execution plan at a designated point; inspecting the query execution plan including one or more of looking up variables in the query execution plan and stepping through the query execution plan to inspect different portions of the query execution for problem determination, while the query execution is paused; resuming execution of the query execution plan from the designated point; and providing updated progress information to update display of the progress indicator, wherein upon the query execution plan's invocation, a wrapper function intervenes and jumps into debugging logic which increments a counter for the current query plan operator, and executes any additional instructions corresponding to the query plan operator, wherein the additional instructions include graphically displaying the progress as an enhancement to a query explain tool, wherein the query explain tool would poll the current status of the actual cardinalities processed for each part of the query execution plan and utilizing the existing explain facility.

2. The computer-implemented method of claim 1, wherein performing the debugging operations further comprises:

modifying a portion of the query execution plan.

3. The computer-implemented method of claim 1, wherein performing the debugging operations further comprises:

skipping at least an unmodified portion of the query execution plan.

4. The computer-implemented method of claim 3, wherein performing the debugging operations further comprises:

modifying a portion of the query execution plan, and skipping at least an unmodified portion of the query execution plan.

5. The computer-implemented method of claim 1, wherein performing the debugging operations further comprises:

modifying a portion of the query execution plan, skipping at least an unmodified portion of the query execution plan and inspecting the query execution plan by looking up variables in the query execution plan and by stepping through the query execution plan to inspect different portions of the query execution, while the query execution is paused.

6. The computer-implemented method of claim 1, wherein inspecting the query execution plan comprises:

stepping through the query execution plan to inspect different portions of the query execution plan and looking up variables in the query execution plan.

7. The computer-implemented method of claim 1, wherein performing the one or more debugging operations further comprises:
resuming execution of the query execution plan from a second designated point.

8. The computer-implemented method of claim 1, wherein displaying a progress indicator for each of the plurality of query plan operators comprises:
displaying a number of rows flowing through each of the plurality of query plan operators in the query execution plan.

9. The computer-implemented method of claim 1, wherein displaying a progress indicator for each of the plurality of query plan operators comprises:
displaying text of a part of the database query corresponding to each of the plurality of query plan operators in the query execution plan.

10. The computer-implemented method of claim 1, wherein displaying a progress indicator for each of the plurality of query plan operators comprises:
displaying values of parameter markers related to each of the plurality of query plan operators in the query execution plan.

11. The computer-implemented method of claim 1, wherein displaying a progress indicator for each of the plurality of query plan operators comprises:
displaying values of host variables related to each of the plurality of query plan operators in the query execution plan.

12. The computer-implemented method of claim 1, wherein displaying a progress indicator for each of the plurality of query plan operators comprises:
displaying the plurality of query plan operators in a tree; and
displaying the progress indicator for each of the plurality of query plan operators below the respective query plan operator in the tree.

13. A database management system for query problem determination, the system comprising:
means for receiving a database query;
means for creating a query execution plan for problem determination of the database query, the query execution plan comprising a plurality of query plan operators;
means for executing the query execution plan;
means for displaying a progress indicator for each of the plurality of query plan operators during execution of the query execution plan in response to progress information;
means for communicating progress information to a query progress analyzer for performing debugging operations; and
means for performing debugging operations during execution of the query execution plan by a query progress analyzer, wherein performing the debugging operations means comprises: means for skipping at least a portion of the query execution plan; means for pausing execution of the query execution plan at a designated point; means for inspecting the query execution plan including one or more of looking up variables in the query execution plan and stepping through the query execution plan to inspect different portions of the query execution for problem determination, while the query execution is paused; means for resuming execution of the query execution plan from the designated point; and means for providing updated progress information to update display of the progress indicator, wherein upon the query execution plan's invocation, a wrapper function intervenes and jumps into debugging logic which increments a counter for the current query plan operator, and executes any additional instructions corresponding to the query plan operator, wherein the additional instructions include graphically displaying the progress as an enhancement to a query explain tool, wherein the query explain tool would poll the current status of the actual cardinalities processed for each part of the query execution plan and utilizing the existing explain facility.

14. The database management system of claim 13, wherein performing the debugging operations means further comprises:
means for modifying a portion of the query execution plan.

15. The database management system of claim 13, wherein performing the debugging operations means further comprises:
means for skipping at least an unmodified portion of the query execution plan.

16. The database management system of claim 15, wherein performing the debugging operations means further comprises:
means for modifying a portion of the query execution plan, and means for skipping at least an unmodified portion of the query execution plan.

17. The database management system of claim 13, wherein performing the debugging operations means further comprises:
means for modifying a portion of the query execution plan, skipping at least an unmodified portion of the query execution plan and inspecting the query execution plan by looking up variables in the query execution plan and by stepping through the query execution plan to inspect different portions of the query execution, while the query execution is paused.

18. The database management system of claim 13, wherein inspecting the query execution plan means comprises:
means for stepping through the query execution plan to inspect different portions of the query execution plan and looking up variables in the query execution plan.

19. The database management system of claim 13, wherein performing the one or more debugging operations means further comprises:
means for resuming execution of the query execution plan from a second designated point.

20. The database management system of claim 13, wherein displaying a progress indicator for each of the plurality of query plan operators means comprises:
means for displaying a number of rows flowing through each of the plurality of query plan operators in the query execution plan.

21. The database management system of claim 13, wherein displaying a progress indicator for each of the plurality of query plan operators means comprises:
means for displaying text of a part of the database query corresponding to each of the plurality of query plan operators in the query execution plan.

22. The database management system of claim 13, wherein displaying a progress indicator for each of the plurality of query plan operators means comprises:
means for displaying values of parameter markers related to each of the plurality of query plan operators in the query execution plan.

23. The database management system of claim 13, wherein displaying a progress indicator for each of the plurality of query plan operators means comprises:

means for displaying values of host variables related to each of the plurality of query plan operators in the query execution plan.

24. The database management system of claim 13, wherein displaying a progress indicator for each of the plurality of query plan operators means comprises:
   means for displaying the plurality of query plan operators in a tree; and
   means for displaying the progress indicator for each of the plurality of query plan operators below the respective query plan operator in the tree.

25. A computer readable storage medium containing program instructions executable on a processing system for query problem determination; the program instructions comprising:
   receiving a database query;
   creating a query execution plan for problem determination of the database query, the query execution plan comprising a plurality of query plan operators;
   executing the query execution plan;
   displaying a progress indicator for each of the plurality of query plan operators during execution of the query execution plan in response to progress information;
   communicating progress information to a query progress analyzer for performing debugging operations; and
   performing debugging operations during execution of the query execution plan by a query progress analyzer, wherein performing the debugging operations comprises: skipping at least a portion of the query execution plan; pausing execution of the query execution plan at a designated point; inspecting the query execution plan including one or more of looking up variables in the query execution plan and stepping through the query execution plan to inspect different portions of the query execution for problem determination, while the query execution is paused; resuming execution of the query execution plan from the designated point; and providing updated progress information to update display of the progress indicator, wherein upon the query execution plan's invocation, a wrapper function intervenes and jumps into debugging logic which increments a counter for the current query plan operator, and executes any additional instructions corresponding to the query plan operator, wherein the additional instructions include graphically displaying the progress as an enhancement to a query explain tool, wherein the query explain tool would poll the current status of the actual cardinalities processed for each part of the query execution plan and utilizing the existing explain facility.

26. The computer readable medium of claim 25, wherein performing the debugging operations further comprises:
   modifying a portion of the query execution plan.

27. The computer readable medium of claim 25, wherein performing the debugging operations further comprises:
   skipping at least an unmodified portion of the query execution plan.

28. The computer readable medium of claim 27, wherein performing the debugging operations further comprises:
   modifying a portion of the query execution plan, and skipping at least an unmodified portion of the query execution plan.

29. The computer readable medium of claim 25, wherein performing the debugging operations further comprises:
   modifying a portion of the query execution plan, skipping at least an unmodified portion of the query execution plan and inspecting the query execution plan by looking up variables in the query execution plan and by stepping through the query execution plan to inspect different portions of the query execution, while the query execution is paused.

30. The computer readable medium of claim 25, wherein inspecting the query execution plan comprises:
   stepping through the query execution plan to inspect different portions of the query execution plan and looking up variables in the query execution plan.

31. The computer readable medium of claim 25, wherein performing the one or more debugging operations further comprises:
   resuming execution of the query execution plan from a second designated point.

32. The computer readable medium of claim 25, wherein displaying a progress indicator for each of the plurality of query plan operators comprises:
   displaying a number of rows flowing through each of the plurality of query plan operators in the query execution plan.

33. The computer readable medium of claim 25, wherein displaying a progress indicator for each of the plurality of query plan operators comprises:
   displaying text of a part of the database query corresponding to each of the plurality of query plan operators in the query execution plan.

34. The computer readable medium of claim 25, wherein displaying a progress indicator for each of the plurality of query plan operators comprises:
   displaying values of parameter markers related to each of the plurality of query plan operators in the query execution plan.

35. The computer readable medium of claim 25, wherein displaying a progress indicator for each of the plurality of query plan operators comprises:
   displaying values of host variables related to each of the plurality of query plan operators in the query execution plan.

36. The computer readable medium of claim 25, wherein displaying a progress indicator for each of the plurality of query plan operators comprises:
   displaying the plurality of query plan operators in a tree; and
   displaying the progress indicator for each of the plurality of query plan operators below the respective query plan operator in the tree.

* * * * *